June 29, 1926.
S. W. ORR
VELOCIPEDE
Filed May 20, 1924
1,590,696
4 Sheets-Sheet 3
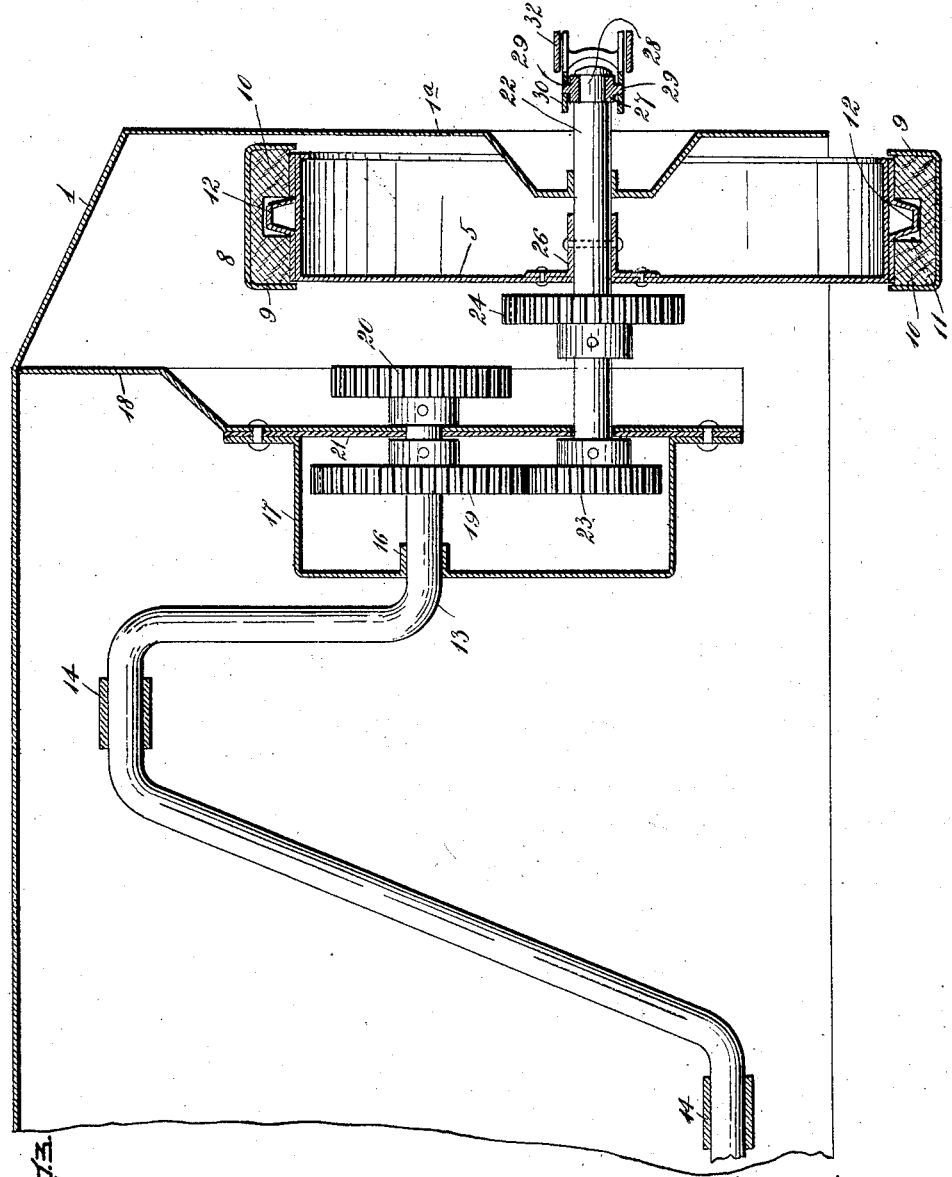

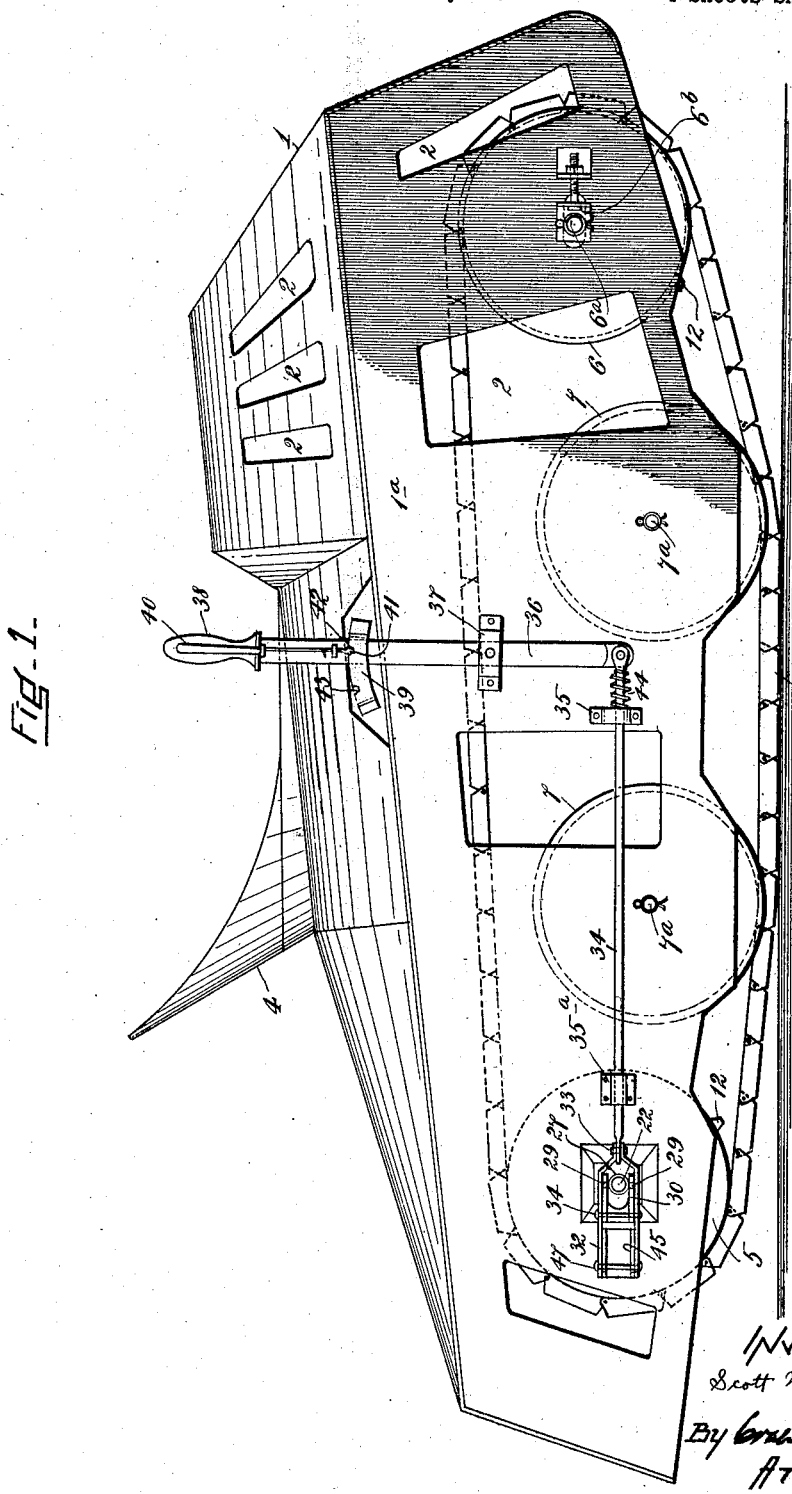

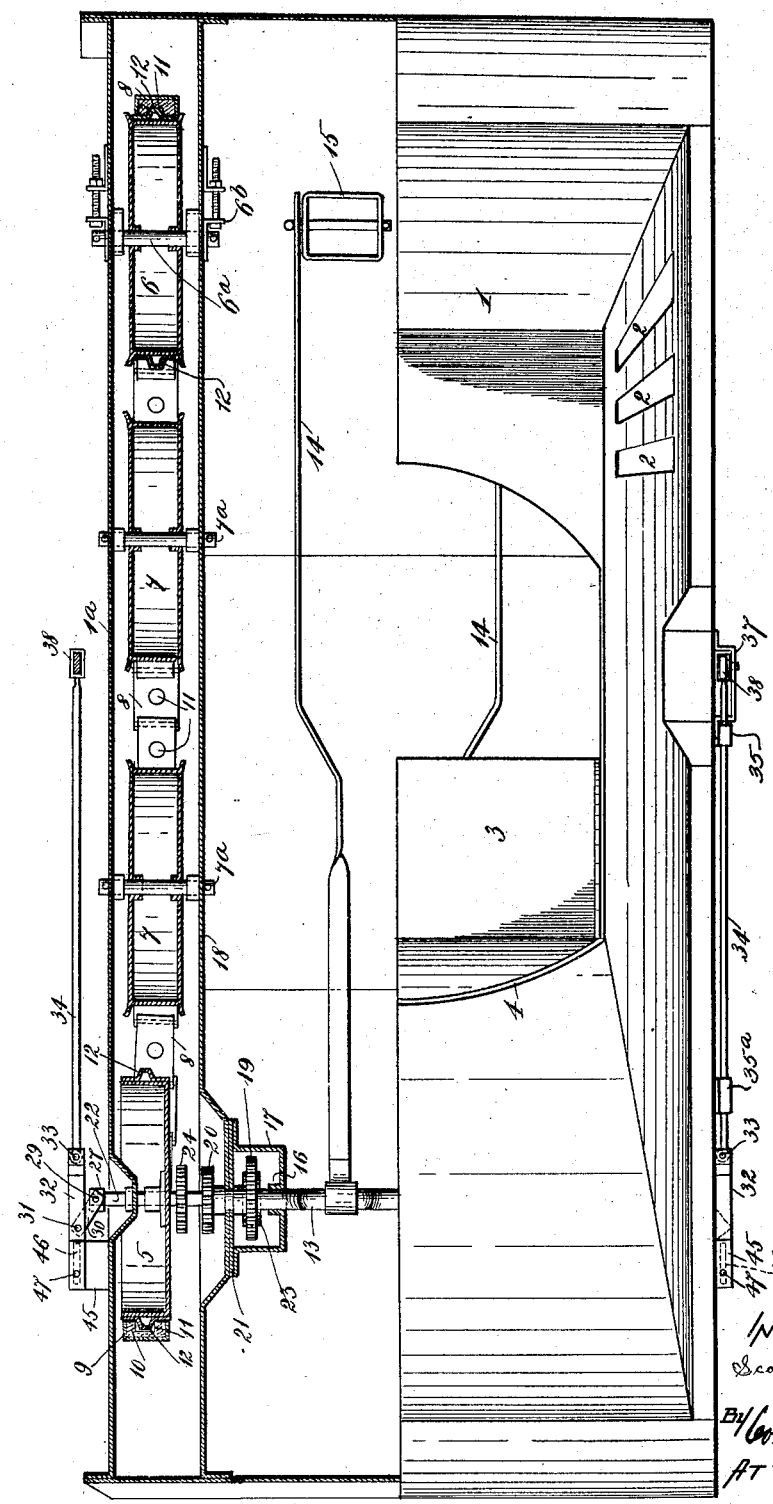

June 29, 1926.
S. W. ORR
1,590,696
VELOCIPEDE
Filed May 20, 1924
4 Sheets-Sheet 4
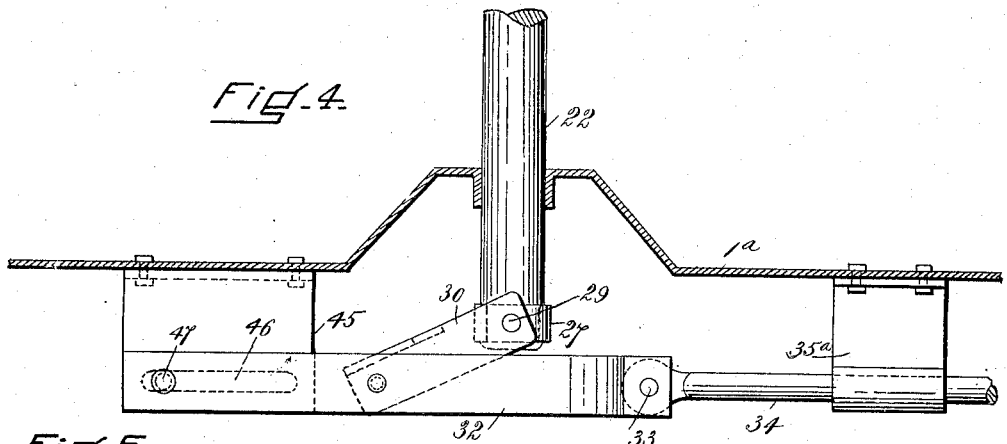
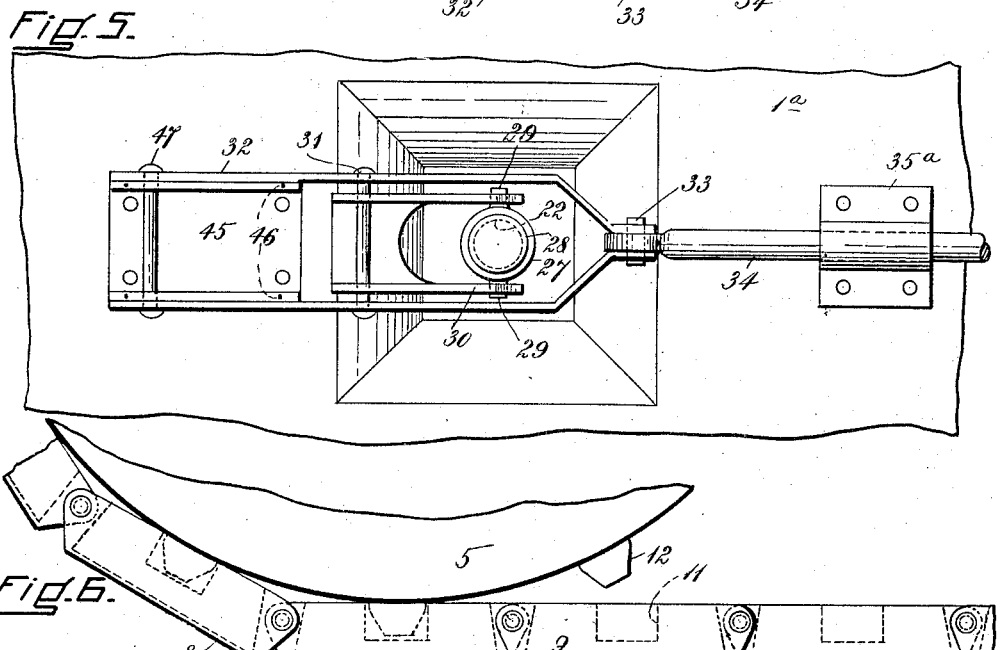
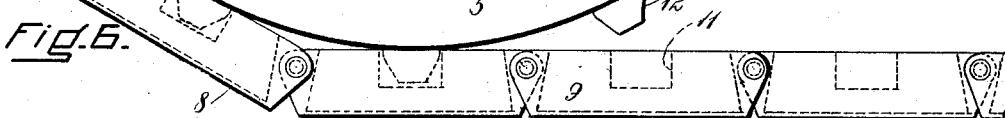
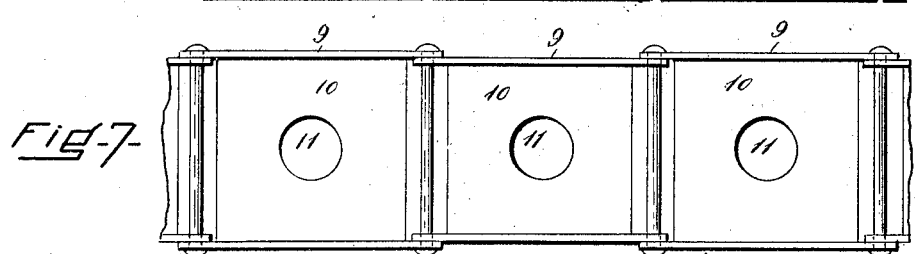
INVENTOR:
Scott W. Orr
BY
ATTORNEYS Patented June 29, 1926.

1,590,696

UNITED STATES PATENT OFFICE.

SCOTT W. ORR, OF CHELSEA, MASSACHUSETTS.

VELOCIPEDE.

Application filed May 20, 1924. Serial No. 714,712.

My invention relates to a velocipede made especially for a child's use, having preferably the outer appearance of a so-called tank and constructed in such manner that change of direction may be given to it by changing the speed of the driving wheels on either side thereof so that while the user is working the treadles at a constant speed the wheel on one side will travel slower than the wheel on the other side and hence the device will move in a curve.

My invention will be understood by reference to the drawings which show it in its preferred form and in which—

Figure 1 is a side elevation, and

Fig. 2 is a plan partly in section of a machine embodying my invention.

Fig. 3 is an enlarged detail showing the means for changing speed, and

Figs. 4 and 5 are other details relating thereto.

Fig. 6 is a side elevation showing the relation of a driving wheel to its traction chain, and Fig. 7 is a plan of the traction chain.

The body of my machine comprises a casing 1 which may be of sheet iron or the like, perforated as desired with openings 2 in its sides $1^a$ to disclose its interior. This casing forms a means of supporting axles and other operative parts of the machine as described below and within it is a seat 3 with a back 4 for the user. The operating parts are in duplicate, each set of parts being mounted on the sides of the casing. The parts on one side only will be described.

As shown this casing is supported on each side by idlers 7 the shafts $7^a$ of which are supported in the side walls $1^a$ of the casing. 5 is a driving wheel and 6 a guide wheel both having sprockets 12. 8 is a traction belt which is constructed as shown in Fig. 7 comprising side bars 9 between which are carried perforated blocks 10, the perforations 11 in which are constructed to receive the sprockets 12 on the driving wheel 5. The side bars 9 of the traction belt are riveted together so that the traction chain is virtually a sprocket chain capable of passing around both the driving wheel 5 and the guide wheel 6. The idlers 7 rest on this traction belt to support the device and the axles of these idlers are at a lower level than the axles of the driving wheel 5 and guide wheel 6 so that they take the weight of the tank being located as they are below the seat. The shaft $6^a$ of the guide wheel is mounted at each end in a usual way as at $6^b$ so that the tightness of the belt 8 may be adjusted.

To drive the tank, a crank or power shaft 13 is provided having crank rods 14 operated by treadles 15 located in front of the occupant's seat and within easy reach of his feet so that as in the ordinary velocipede, by moving the treadles 15 the crank shaft 13 is turned in either direction.

The crank shaft 13 extends across the machine and on each side passes through a bearing 16 supported in a suitable gearing box 17 attached to an inner wall 18 mounted on the casing 1.

On this crank shaft are mounted two gears 19 and 20 of different sizes, these gears being supported on the outer end of the crank shaft 13, one on each side of the wall 18, which is preferably reinforced at this point by the plate 21. The gears 19 and 20 are of different sizes and are connected to the shaft 22 on which is mounted the driving wheel 5 by means of gears 23 and 24. Normally the gear 23 is in mesh with the gear 19, but means are provided whereby the shaft 22 which carries these gears may be moved inwardly in such manner as to disconnect the gear 23 from the gear 19 and throw the gear 24 into mesh with the gear 20, thus changing the speed of the wheel 5. The shaft 22 is connected to the driving wheel 5 by means of a flanged collar 26 which is riveted both to the wheel and to the shaft as shown in Fig. 3. It will be seen that by throwing the shaft 22 inwardly so as to shift the gear 23 out of mesh with the gear 19 and at the same time throwing the gear 24 into mesh with the gear 20 the speed of the corresponding wheel 5 will be slowed down with relation to the speed of the wheel 5 on the other side of the machine where the gears 19 and 23 are still in mesh. Thus the travel of the traction belt 8 on that side of the machine will be reduced and, as the traction belt 8 will thus be caused to move a shorter distance for each movement of the treadles 15 than the traction belt on the other side of the machine, the machine will turn in the direction of the side having the slower moving belt.

To throw the gears 23 and 24 into and out of mesh the shaft 22 has on its outer end a collar 27 within which it turns. Beyond the collar it is held in any convenient way as at 28 which indicates a groove in the shaft in which the collar sets so that the collar in the form shown provides a bearing for the outer end of the shaft. This collar is provided with lugs 29 each of which carries a link 30 pivotally connected as at 31 with a yoke piece 32 which is pivotally connected as at 33 with a rod 34. This rod 34 passes through two straps 35, 35ª attached to the outer side of the casing 1 and is connected to a hand lever 36 which passes up through and is pivoted to a strap 37 also connected to the casing and terminates in a handle 38. 39 is a notched bar attached to the casing to cooperate with a lock lever 40 of usual construction, the upper end of which may be gripped with the handle by the operator to withdraw its lower end 41 from one of the notches 42, 43, thus unlocking the handle and allowing it to be moved toward the other notch 43, or vice versa. A spring 44 on the rod 34 and lying between the lower end of the hand lever 36 and the strap 35 tends to pull the lower end of the hand lever into its forward position.

The yoke piece 32 is supported at its outer end in the following manner: A bracket 45 is mounted on the outside of the casing and is slotted as at 46. The yoke piece 32 has a bolt or pin 47 which passes through the slot 46 so that the yoke piece may slide forward or backward in a motion parallel to the sides. The slot 46 is long enough to allow the rod 34 a proper motion to accomplish the gear-changing and its bottom and top walls serve not only to support the pin 47, but its end walls serve as stops to limit the throw of the rod 34 and hand lever.

The operation of the tank will be understood from the above description. The belt 8 is first adjusted to the tension desired and the user from his seat moves the treadles to operate the tank, the handles 38 on both sides of the tank being in vertical position and the lock lever 40 being in notch 42. To turn a corner he withdraws the lock lever 40 on that side of the tank from its notch 42 and moves the handle 38 rearward, thus shifting the gears on that side of the tank so that the belt 8 is moved slower on that side of the tank than on the other side and the tank turns. Before the corner has been turned the handle is returned to its vertical position shifting the gears so that both driving wheels will run again at the same speed.

Other embodiments of my invention will occur to those skilled in the art.

What I claim as my invention is:—

1. In a machine of the kind described, a body and movable means for supporting it comprising traction belts and means for moving said traction belts comprising sprocket wheels and means for rotating them and means for changing the speed of said sprocket wheels independently.

2. In a machine of the kind described, a body and movable means for supporting it comprising traction belts and means for moving said traction belts comprising sprocket wheels and means for rotating them and means for changing the speed of said sprocket wheels independently, said means comprising a shaft for each sprocket wheel, and a power shaft and speed-adjusting means connecting said power shaft with each sprocket wheel independently, and means for operating each speed-adjusting means independently of the other.

SCOTT W. ORR.